United States Patent
Schaumann et al.

(10) Patent No.: US 11,339,824 B2
(45) Date of Patent: May 24, 2022

(54) BALL-AND-SOCKET JOINT FOR CHASSIS PARTS OF A MOTOR VEHICLE

(71) Applicant: THK RHYTHM AUTOMOTIVE GMBH, Duesseldorf (DE)

(72) Inventors: Lothar Schaumann, Duesseldorf (DE); Harald Walter, Duesseldorf (DE)

(73) Assignee: THK RHYTHM AUTOMOTOVE GMBH, Duesseldorf (DE)

( * ) Notice: Subject to any disclaimer, the term of this patent is extended or adjusted under 35 U.S.C. 154(b) by 0 days.

(21) Appl. No.: 16/971,445

(22) PCT Filed: Feb. 22, 2019

(86) PCT No.: PCT/EP2019/054221
§ 371 (c)(1),
(2) Date: Nov. 17, 2020

(87) PCT Pub. No.: WO2019/162330
PCT Pub. Date: Aug. 29, 2019

(65) Prior Publication Data
US 2021/0131484 A1    May 6, 2021

(30) Foreign Application Priority Data
Feb. 20, 2018    (DE) .................... 10 2018 103 780.5

(51) Int. Cl.
*F16C 11/06*    (2006.01)
*F16C 33/04*    (2006.01)
*B60G 7/00*    (2006.01)
*F16C 33/10*    (2006.01)

(52) U.S. Cl.
CPC .......... *F16C 11/0614* (2013.01); *B60G 7/005* (2013.01); *F16C 11/0623* (2013.01); *F16C 33/046* (2013.01); *F16C 33/1065* (2013.01); *F16C 2220/04* (2013.01); *F16C 2326/05* (2013.01)

(58) Field of Classification Search
CPC .............. F16C 11/0614; F16C 11/0623; F16C 11/0638; F16C 33/046; F16C 33/1065; F16C 2220/04; F16C 2326/05; B60G 7/005; B60G 2204/416
USPC .... 384/203, 297, 208, 213; 403/76, 90, 114, 403/141–143
See application file for complete search history.

(56) References Cited

U.S. PATENT DOCUMENTS 3,695,651 A    10/1972    Stuck
3,944,376 A    3/1976    Hata
(Continued)

FOREIGN PATENT DOCUMENTS

BR    102013008312 A2 *    8/2017    ............... F16K 1/14
CN    101715519 A *    5/2010    ............. F16C 33/28
(Continued)

*Primary Examiner* — Marcus Charles
(74) *Attorney, Agent, or Firm* — McNees Wallace & Nurick LLC (57) ABSTRACT

A ball joint including a ball stud which has a spherical portion, two bearing shells that are arranged on the spherical portion such that there is a small gap between the two bearing shells, and a housing that is made from plastic in one piece and encloses the two bearing shells such that the two bearing shells are urged against the spherical portion by the housing.

10 Claims, 6 Drawing Sheets

(56) References Cited

U.S. PATENT DOCUMENTS

| | | | | |
|---|---|---|---|---|
| 4,678,350 A * | 7/1987 | Statz | ............... | F16C 11/0614 |
| | | | | 384/208 |
| 5,058,867 A * | 10/1991 | Hadano | ............... | F16C 11/0614 |
| | | | | 267/141.3 |
| 5,931,597 A * | 8/1999 | Urbach | ............... | B62D 7/16 |
| | | | | 403/134 |
| 6,350,060 B1 * | 2/2002 | Peterson | ............... | F16C 11/0614 |
| | | | | 384/208 |
| 6,692,179 B2 * | 2/2004 | Bohne | ............... | F16C 11/0614 |
| | | | | 403/141 |
| 6,776,552 B2 * | 8/2004 | Marunaka | ............... | F16C 11/0614 |
| | | | | 384/558 |
| 7,438,493 B2 * | 10/2008 | Holmes | ............... | F16C 11/0614 |
| | | | | 403/134 |
| 7,543,992 B2 * | 6/2009 | Bruce | ............... | F16C 7/02 |
| | | | | 384/192 |
| 8,171,600 B2 * | 5/2012 | Draper | ............... | B25G 1/102 |
| | | | | 16/441 |
| 8,783,702 B2 * | 7/2014 | Lee | ............... | F16C 11/0614 |
| | | | | 280/124.134 |
| 9,291,194 B2 | 3/2016 | Strobel et al. | | |
| 2004/0046295 A1 * | 3/2004 | Rechtien | ............... | F16C 27/063 |
| | | | | 267/140.12 |
| 2008/0304902 A1 * | 12/2008 | Buchner | ............... | F16C 11/0614 |
| | | | | 403/76 |
| 2009/0152834 A1 | 6/2009 | Richter et al. | | |
| 2012/0141192 A1 * | 6/2012 | Kwon | ............... | F16C 11/0657 |
| | | | | 403/135 |
| 2013/0247380 A1 * | 9/2013 | Kwon | ............... | F16C 11/0614 |
| | | | | 29/898.049 |
| 2014/0376991 A1 | 12/2014 | Strobel et al. | | |

FOREIGN PATENT DOCUMENTS

| | | | | |
|---|---|---|---|---|
| DE | 1953000 A | 5/1971 | | |
| DE | 4109697 C1 * | 6/1992 | ............... | F16C 11/0614 |
| DE | 10362009 B4 | 4/2005 | | |
| DE | 10361289 B4 | 7/2005 | | |
| DE | 102016203470 A1 | 9/2017 | | |
| EP | 0132598 B1 * | 12/1986 | ............... | F16C 11/0638 |
| EP | 0276420 A2 * | 8/1988 | ............... | F16C 11/0638 |
| EP | 2284408 A1 | 2/2011 | | |
| EP | 2465713 A1 | 6/2012 | | |
| WO | WO-0188394 A1 * | 11/2001 | ............... | F16C 11/0657 |
| WO | 2013091792 A1 | 6/2013 | | |

* cited by examiner

BALL-AND-SOCKET JOINT FOR CHASSIS PARTS OF A MOTOR VEHICLE

CROSS-REFERENCE TO RELATED APPLICATIONS

This application claims priority to PCT Application No. PCT/EP2019/054221, having a filing date of Feb. 20, 2019, based off on German application No. DE 10 2018 103 780.5 having a filing date of Feb. 20, 2018, the entire contents of both are hereby incorporated by reference.

BACKGROUND

(1) Field of the Invention

The present disclosure relates to a ball joint that includes a ball stud which is received within a housing by means of two bearing shells.

A wide variety of configurations of ball joints is known. In the case of ball joints intended for chassis parts of a motor vehicle, the usual requirements are that the ball stud is received in the housing with high extraction forces, that a precisely defined friction moment acts between the ball stud and the bearing shell, and that low wear occurs.

(2) Description of Related Art

EP 2 284 408 A1 discloses a ball joint in which the two bearing shells are placed inside a metal housing and then over-molded with a plastic material. The housing is provided with a knurling on the inside so that the plastic is mechanically held within the housing.

SUMMARY

An object of the present disclosure is to provide a ball joint which distinguishes itself by better performance figures and can be produced at low cost.

To achieve this object, according to an example embodiment, a ball joint is provided which includes a ball stud having a spherical portion, two bearing shells that are arranged on the spherical portion such that there is a small gap between them, and a housing that is made from plastic in one piece and encloses the two bearing shells such that they are urged against the spherical portion by the housing. This ball joint can be manufactured at low cost, since the plastic material that encloses the two bearing shells acts as a housing that is in direct contact with the two bearing shells and exhibits the necessary strength and stability. No outer housing is required. Also, this design avoids the problem occurring in the prior art that the plastic that is injected around the bearing shells will shrink during curing, which makes a reliable connection with the actual housing more difficult. The ball joint according to the invention further has the advantage that the shrinkage of the plastic material that is used for over-molding the bearing shells can be purposefully converted into a contact pressure by which the bearing shells are urged against the spherical portion because the two bearing shells are displaceable in the axial direction relative to the spherical portion, owing to the gap that exists between them and which is free of material etc. In the prior art, on the other hand, the bearing shells are supported against each other, so that they have to be heavily deformed altogether if they are to be pressed against the spherical portion with a preload force.

According to one example embodiment, it is provided that the bearing shells include alternating engagement sections so that they are centered in the radial direction and in the circumferential direction, but are displaceable in relation to each other in the axial direction. The engagement sections ensure that the two bearing shells remain centered relative to each other even when they are arranged in an injection mold and liquid plastic is pressed into the injection mold.

The engagement sections are provided with interruptions in the circumferential direction.

Particularly advantageously, the engagement sections, as viewed in the circumferential direction, are closely adjacent to each other. This ensures, without any additional measures, that the liquid plastic material cannot reach the area between the two bearing shells and/or the spherical portion during over-molding; this would be disadvantageous to the functioning of the ball joint.

Preferably, the engagement sections together form a collar which protrudes outwards and is firmly enclosed by the material of the housing. The collar assists in reliably anchoring the two bearing shells within the plastic housing.

Preferably, the engagement sections of one bearing shell lock in place with the other bearing shell. It allows the two bearing shells to be preassembled on the ball stud so that it can be arranged with the latter as one assembly in an injection mold.

According to one configuration, provision is made that the bearing shells have pocket-shaped depressions on their outer surfaces. The pocket-shaped depressions result in a purposeful reduction in the wall thickness of the bearing shells, so that the resilience of the bearing shells in the radial direction and thus the contact pressure by which the bearing shells are pressed against the spherical portion can be adjusted there.

Preferably, the wall thickness of the bearing shells at the bottom of the depressions is less than 50% of the wall thickness of the bearing shells between neighboring depressions, so that the elasticity of the bearing shells in the region of the bottom of the pockets is significantly increased.

According to one configuration, it is provided that the bearing shells are provided with lubricant grooves which open at the axial ends of the bearing shells. This allows the ball joint to be greased subsequently, that is, after the housing has been injection molded onto the bearing shells.

The housing may be provided with recesses which, starting from the axial face sides, extend toward the center. The recesses allow a selective adjustment of the stiffness of the housing and thus the pretension applied to the bearing shells by the housing. In addition, the recesses result in a weight saving.

According to one configuration, provision is made that the housing adheres to the bearing shells. This can be achieved by over-molding the bearing shells with a plastic material that is at a suitable temperature so that the bearing shells are slightly surface-fused on the outside. In addition, for the plastic housing a material is used that can form an inter-material bond with the material of the bearing shells. For example, the same material is used for the housing as for the bearing shells.

BRIEF DESCRIPTION OF THE DRAWINGS

The present disclosure will be described below with reference to an example embodiment that is illustrated in the accompanying drawings, in which.

DETAILED DESCRIPTION OF EXAMPLE EMBODIMENTS

Figure 1:
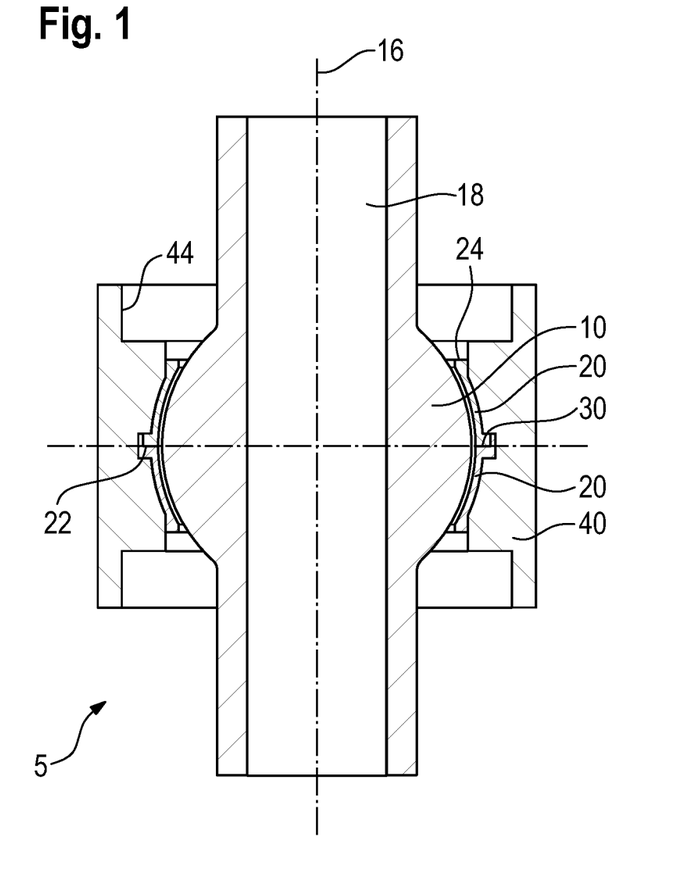
FIG. 1 shows a longitudinal section of a ball joint according to an example embodiment.
Figure 2:
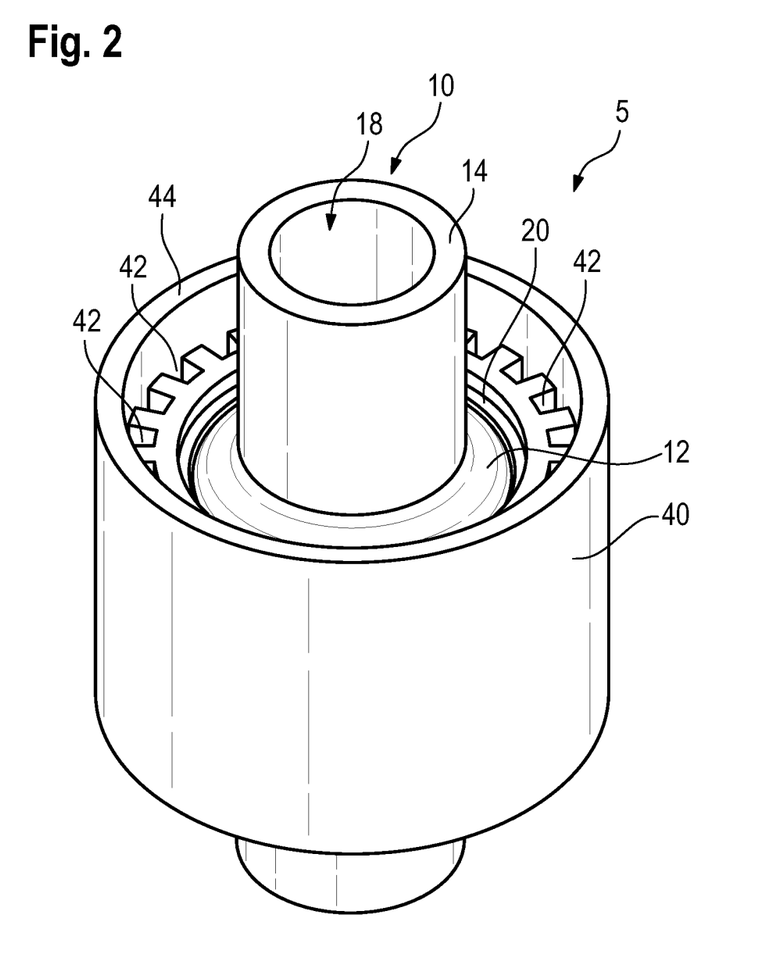
FIG. 2 shows a perspective view of the ball joint of FIG. 1.

FIGS. 1 and 2 show a ball joint 5 which includes as its essential parts a ball stud 10, two bearing shells 20 and a housing 40.

The ball stud 10 includes a spherical portion 12 from which a respective stud 14 extends at opposite ends. The two studs are arranged concentrically with a central axis 16, which also extends through the center of the spherical portion 12.

To simplify the discussion, it will be assumed in the following that the central axis 16 extends through the "poles" of the sphere underlying the spherical portion 12. In the embodiment shown, the outer surface of the spherical portion 12 thus extends along the "equator" of the spherical portion 12. The "latitude" up to which the outer surface of the spherical portion 12 extends depends on the diameter of the studs 14. In the exemplary embodiment shown, the outer surface extends up to a level of about ±40°.

Basically, it is also conceivable that only one stud 14 is provided.

In the embodiment shown, the ball stud 10 is hollow. In other words, there is a cavity 18 that extends through the two studs 14 and the spherical portion 12.

In the embodiment shown, the ball stud 10 is made of metal, in particular of steel.

The two bearing shells 20 are each designed to be continuous in the circumferential direction. They have an inner circumferential edge 22 and an outer circumferential edge 24. The inner circumferential edge 22 is arranged on the side of the equator of the spherical portion 12 here, while the outer circumferential edge 24 is arranged on the side of the studs 14.

The inner surface of each bearing shell 20 has the shape of a spherical segment.

The bearing shells are made of plastic; a wide variety of thermoplastic and thermosetting plastics can be used here.

Figure 3:
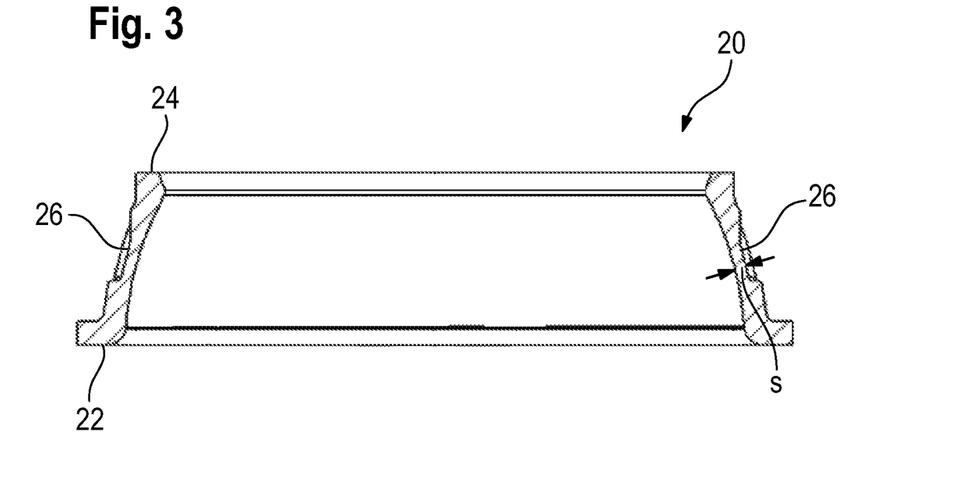
FIG. 3 schematically shows a section of a bearing shell of the ball joint of FIG. 1, with the bearing shell provided with pocket-shaped depressions on its outside.
Figure 4:
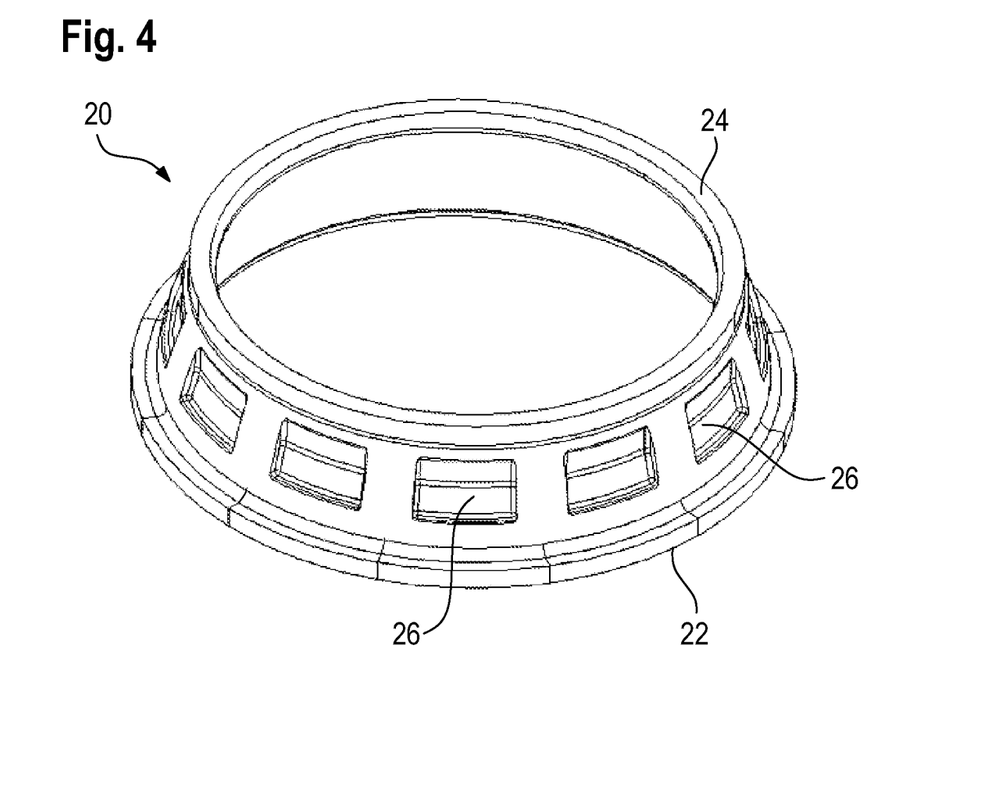
FIG. 4 shows a perspective view of the bearing shell of FIG. 3.

As can be seen in FIGS. 3 and 4, each bearing shell 20 includes a plurality of pocket-like depressions 26 on its outside, that is, the side facing away from the spherical portion 12.

Each depression 26 is self-contained, i.e., has a circumferential edge 28 which delimits the depression 26 from the outer surface of the bearing shell 20.

The depressions 26 serve to locally reduce the wall thickness of the bearing shells 20. In the exemplary embodiment shown, the wall thickness s at the bottom of the depressions is less than 50% of the wall thickness of the bearing shells 20 in the area between the depressions 26.

The dimensions of the depressions may be adjusted to the respective requirements. In the exemplary embodiment shown, the height of the depressions, that is, as measured parallel to the central axis 16, is on the order of 30% of the height of the corresponding bearing shell.

In the exemplary embodiment shown, the distance between neighboring depressions 26 as measured in the circumferential direction is about 50% of the width of each depression 26.

Figure 5:
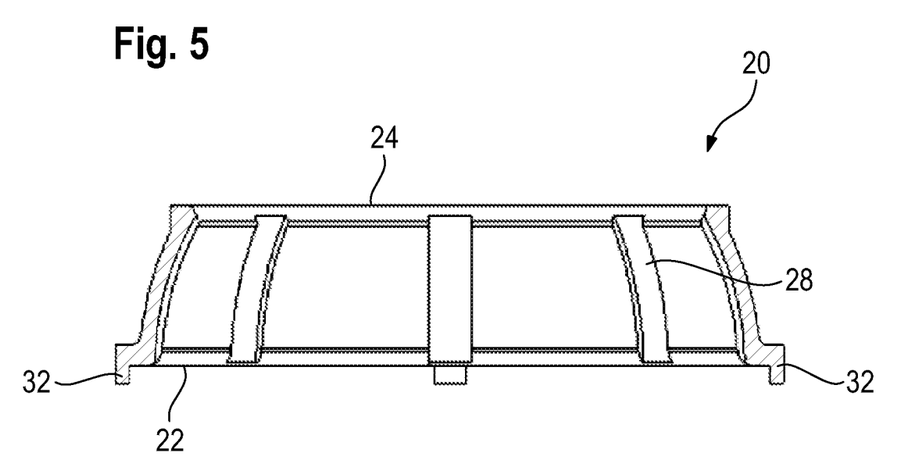
FIG. 5 schematically shows a section of a bearing shell of the ball joint of FIG. 1, with the bearing shell provided with lubricant grooves on its inside.
Figure 6:
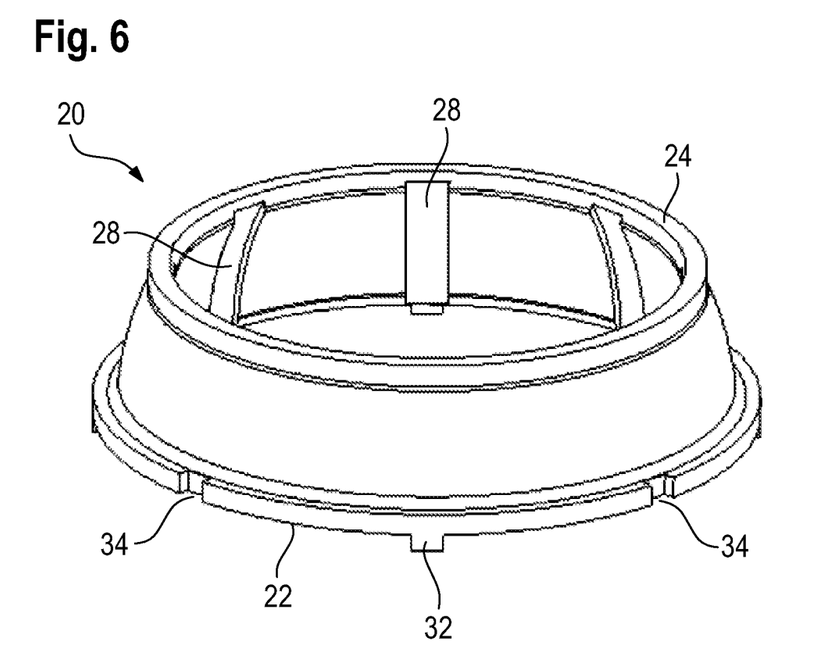
FIG. 6 shows a perspective view of the bearing shell of FIG. 5.

As can be seen in FIGS. 5 and 6, each bearing shell 20 includes a plurality of lubricant grooves 28 on its inner surface, i.e., the side that cooperates with the outer surface of the spherical portion 12. These grooves open at the outer circumferential edge 24.

In the exemplary embodiment shown, the lubricant grooves 28 extend in the direction of lines of longitude on the spherical portion. Alternatively, it is also possible for the lubricant grooves to extend obliquely to the lines of longitude at an angle different from 0 degrees.

The pocket-like depressions 26 and the lubricant grooves 28 are shown on different bearing shells 20 here. In practice, the ball joint 5 may include either the pocket-like depressions 26 or the lubricant grooves 28 or both the pocket-like depressions 26 and the lubricant grooves 28.

There is a small gap 30 between the two bearing shells 20 when they are preassembled on the spherical portion 12. In other words: the two inner circumferential edges 22 of the bearing shells 20 are positioned opposite each other at a distance equal to the width of the gap 30. Therefore the gap extends along the equator of the spherical portion 12 (assuming that the two bearing shells are arranged so as to be exactly centered on the spherical portion 12).

The inner circumferential edges 22 of the bearing shells are alternately provided with engagement sections 32, 34. "Alternate" here means that the engagement sections 32 arranged on one bearing shell 20 cooperate with the engagement sections 34 provided on the other bearing shell 20.

More specifically, one engagement section 32 of one bearing shell 20 is disposed between two neighboring engagement sections 34 of the other bearing shell 20.

One example of alternately arranged engagement sections 32, 34 is shown in FIGS. 5 and 6. Each of the bearing shells 20 is provided with narrow webs 32 protruding in the axial direction and engaging with corresponding slots 34 of the other bearing shell 20.

The engagement sections cooperating with one another provide for an interlocking fit between the two bearing shells 20 in the circumferential direction and center them relative to each other. At the same time, they allow the two bearing shells to be displaced in relation to each other in the axial direction.

Figure 7:
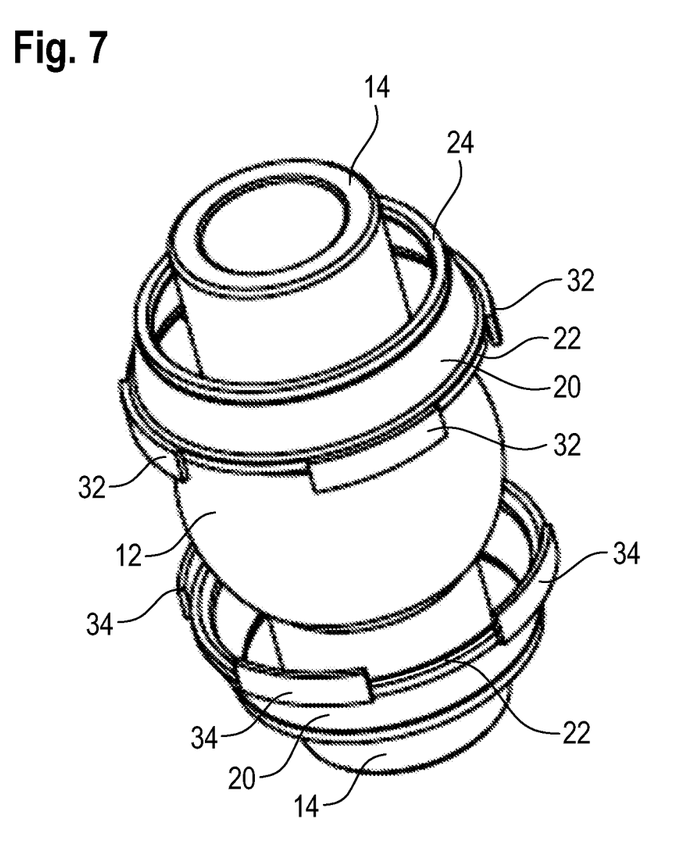
FIG. 7 shows a step in the preassembly of the ball joint according to an example embodiment in a perspective view.

FIG. 7 shows a further configuration of the engagement sections 32, 34. The difference from the configuration shown in FIGS. 5 and 6 resides in that the engagement sections 32, 34 are in the form of outer skirts which are arranged radially outside the inner circumferential edges 22 located opposite each other and project beyond them in the axial direction toward the opposite bearing shell 20.

Furthermore, the engagement sections 32 of one bearing shell 20 are as wide in the circumferential direction as the engagement sections 34 of the other bearing shell 20. As a result, one skirt 32 of one bearing shell is positioned between two neighboring skirts 34 of the other bearing shell.

The engagement sections 32, 34 are dimensioned with a transition fit or a clearance fit with a very small clearance.

Therefore, the skirts 32, 34 close the gap 30 between the bearing shells 20 toward the outside while the two bearing shells 20 are nonetheless displaceable relative to each other in the axial direction.

Each skirt 32, 34 is preferably provided with a small detent edge at its front edge, which can cooperate with the inner circumferential edge 22 of the other bearing shell, so that the two bearing shells can be pre-mounted to each other.

Figure 8:
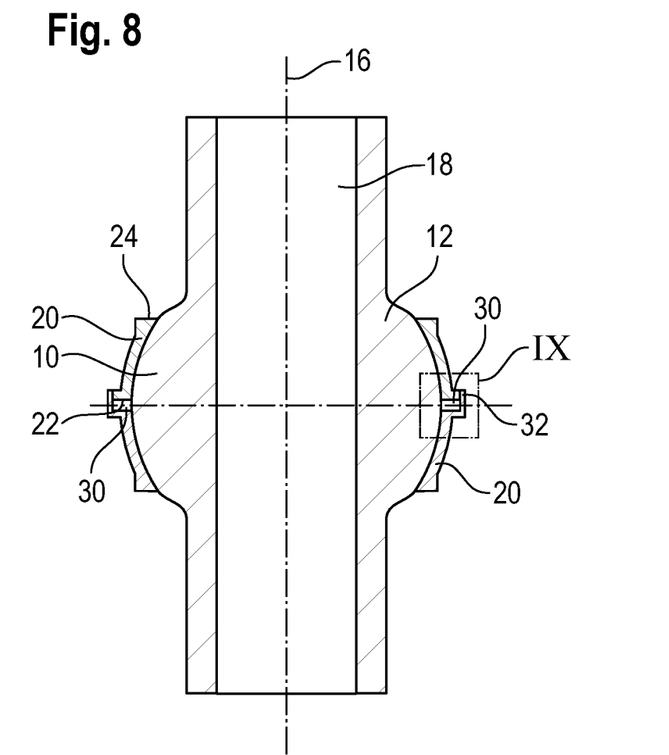
FIG. 8 shows a sectional view of a preassembled unit made up of the ball stud and the bearing shells before over-molding.

To manufacture the ball joint 5, in a first step two bearing shells 20 are preassembled on the spherical portion 12. To this end, they are slid over the studs 14 from opposite directions until they are arranged on the spherical portion 12. In the process, the skirts 32, 34 will snap into place on the inner circumferential edge 22 of the respective other bearing shell 20 so that the two bearing shells are captively preassembled on the ball stud 10.

If desired, the bearing shells 20 and/or the spherical portion 12 may be greased before the bearing shells 20 are mounted.

The unit preassembled in this way is placed in an injection mold, and the two bearing shells 20 are over-molded with a plastic material that constitutes the housing 40. The axial ends of the two bearing shells 20 are sealed by the injection mold so that no material can reach the ball stud 10 there.

Figure 9:
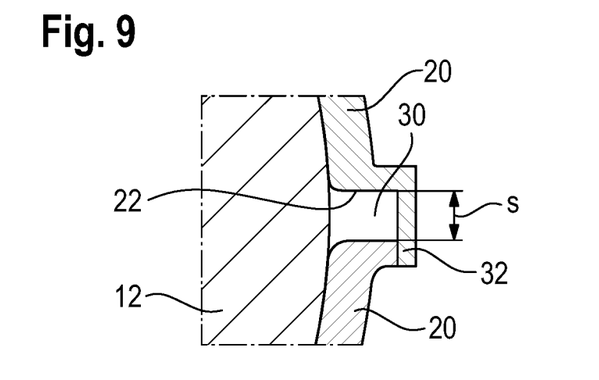
FIG. 9 shows the detail IX of FIG. 8 on an enlarged scale.

The engagement sections 32, 34 provide a seal between the two bearing shells 20 such that no material can get between the two bearing shells 20 and the gap 30 thus remains free.

When the housing 40 is cured, the shrinkage of the plastic material ensures that the two bearing shells 20 are pushed together in the axial direction. Since the gap 30 exists between the two bearing shells 20, the shrinkage pressure is converted into a preload by which the inner surfaces of the bearing shells 20 are pressed against the spherical portion 12 of the ball stud.

The shrinkage pressure applied to the bearing shells 20 by the housing 40 also ensures that the bearing shells are pressed against the spherical portion 12 in the radial direction. The preload thus produced between the bearing shells 20 and the spherical portion 12 can still be adjusted by the selected dimensions of the pocket-like depressions 26. The smaller the remaining wall thickness at the bottom of the pocket-like depressions 26, the lower the stiffness of the bearing shells 20 in these areas and the higher the preload by which the bearing shells 20 are pressed against the spherical portion 12 in these areas.

The injection mold is dimensioned such that the housing 40 as such is inherently stable and encloses the bearing shells 20 so firmly that all loads or stresses occurring later in operation can be absorbed by the housing 40.

With a suitable temperature control during injection molding and with a suitable selection of the materials for the bearing shells 20 and the housing 40, the housing will connect with the bearing shells 20. Regardless of any inter-material bond possibly formed between the bearing shells 20 and the housing 40, the housing 40 encloses the bearing shells 20 with an interlocking fit. In this way the collar formed by the engagement sections 32, 34 is encompassed by the housing 40. In addition, the housing 40 engages in the pocket-like depressions 26.

The housing 40 may be provided with a plurality of recesses 42, which can be seen in FIG. 2. The recesses may serve to save weight. In addition, by selecting the width, the depth to which the recesses 42 extend into the housing in the axial direction, and the position of the recesses 42, the shrinkage pressure that the housing 40 exercises on the bearing shells 20 can be adjusted.

The housing 40 may be provided with fastening sections 44, schematically indicated in FIG. 2, to each of which one end of a sealing grommet may be attached. The other end of the sealing grommet may be attached to the stud 14.

After the ball joint 5 has been removed from the injection mold, it may be filled with grease or some other lubricant. To this end, the grease is pressed into the joint via the axially opening lubricant grooves 28.

The invention claimed is:

1. A ball joint, comprising:
   a ball stud, which includes a spherical portion;
   two bearing shells, each bearing shell having a collar which protrudes outwardly and that the two bearing shells are arranged on the spherical portion such that there is a small gap therebetween; and
   a housing that is made from plastic in one piece and encloses the two bearing shells such that the collar assists in anchoring the two bearing shells within the housing and that the two bearing shells are urged against the spherical portion by the housing.

2. The ball joint according to claim 1, wherein the two bearing shells include alternating engagement sections so that the two bearing shells are centered in a radial direction and in a circumferential direction, but are displaceable in relation to each other in an axial direction.

3. The ball joint according to claim 2, in that wherein the engagement sections, as viewed in the circumferential direction, are closely adjacent to each other.

4. The ball joint according to claim 3, wherein the engagement sections together form the collar which protrudes outwards and is firmly enclosed by a material of the housing.

5. The ball joint according to claim 2, wherein the engagement sections of one bearing shell lock in place with the other bearing shell.

6. The ball joint according to claim 1, wherein the two bearing shells have pocket-shaped depressions on their outer surfaces.

7. The ball joint according to claim 6, wherein a wall thickness of the two bearing shells at a bottom of the depressions is less than 50% of a wall thickness of the two bearing shells between neighboring depressions.

8. The ball joint according to claim 1, wherein the two bearing shells are provided with lubricant grooves which open at axial ends of the two bearing shells.

9. The ball joint according to claim 1, wherein the housing is provided with recesses which, starting from axial face sides, extend toward a center.

10. The ball joint according to claim 1, wherein the housing adheres to the two bearing shells.

\* \* \* \* \*